United States Patent
Ogiwara (10) Patent No.: US 11,118,640 B2
(45) Date of Patent: Sep. 14, 2021

(54) WET PARKING BRAKE DEVICE AND METHOD OF ASSEMBLING THE SAME

(71) Applicant: KABUSHIKI KAISHA TOYOTA JIDOSHOKKI, Kariya (JP)

(72) Inventor: Takashi Ogiwara, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 287 days.

(21) Appl. No.: 16/439,852

(22) Filed: Jun. 13, 2019

(65) Prior Publication Data
US 2019/0383337 A1 Dec. 19, 2019

(30) Foreign Application Priority Data
Jun. 18, 2018 (JP) .............................. JP2018-115293

(51) Int. Cl.
| | |
|---|---|
| *F16D 65/853* | (2006.01) |
| *F16D 55/38* | (2006.01) |
| *F16D 65/18* | (2006.01) |
| *B66F 9/075* | (2006.01) |
| *F16D 121/14* | (2012.01) |

(Continued)

(52) U.S. Cl.
CPC ........... *F16D 55/38* (2013.01); *F16D 65/186* (2013.01); *B60T 1/065* (2013.01); *B66F 9/07509* (2013.01); *F16D 2121/14* (2013.01); *F16D 2125/32* (2013.01); *F16D 2200/0004* (2013.01); *F16D 2250/0023* (2013.01); *F16D 2250/0084* (2013.01)

(58) Field of Classification Search
CPC .......... F16D 55/36; F16D 55/38; F16D 55/39; F16D 65/186; F16D 65/853; F16D 2055/0058; F16D 2121/14; F16D 2125/26; F16D 2125/28; F16D 2250/0084; B66F 9/07509
See application file for complete search history.

(56) References Cited

U.S. PATENT DOCUMENTS

| | | | | |
|---|---|---|---|---|
| 4,498,560 | A * | 2/1985 | Purdy ..................... | B60T 1/065 188/1.11 R |
| 6,119,819 | A * | 9/2000 | Von Kaler ............. | B60K 17/08 188/71.5 |

(Continued)

FOREIGN PATENT DOCUMENTS

JP      2008-002639 A      1/2008

*Primary Examiner* — Nicholas J Lane
(74) *Attorney, Agent, or Firm* — Sughrue Mion, PLLC (57) ABSTRACT

A wet parking brake device includes a shaft case, a rotary shaft, a plurality of stators, a plurality of brake discs, a piston member, and a pressing mechanism. The wet parking brake device is configured such that the brake discs and the stators come in contact with each other by a pressure from the piston member pressed by the pressing mechanism to thereby generate a braking force against the rotary shaft. The pressing mechanism includes a parking rod. The parking rod includes a rod main body, a turning shaft portion, and a connecting shaft. The shaft case includes an opening and a shaft hole. A length of the parking rod, the diameter of the shaft hole and the diameter of the turning shaft portion are respectively designed such that the turning shaft portion is inserted into the shaft hole when the parking rod is inserted from the opening.

3 Claims, 9 Drawing Sheets

(51) Int. Cl.
*F16D 125/32* (2012.01)
*B60T 1/06* (2006.01)

(56) References Cited

U.S. PATENT DOCUMENTS

2018/0290870 A1* 10/2018 Masuda ............... B60K 17/046
2019/0376569 A1* 12/2019 Maruta .................. F16D 55/50

* cited by examiner

WET PARKING BRAKE DEVICE AND METHOD OF ASSEMBLING THE SAME

CROSS-REFERENCE TO RELATED APPLICATION

This application claims priority to Japanese Patent Application No. 2018-115293 filed on Jun. 18, 2018, the entire disclosure of which is incorporated herein by reference.

BACKGROUND ART

The present disclosure relates to a wet parking brake device and a method of assembling the wet parking brake device.

Japanese Patent Application Publication No. 2008-2639 discloses an example of a parking brake device, which is known as a conventional wet parking brake device. The parking brake device disclosed in the Publication includes a plurality of brake discs and stators. The brake discs are arranged, on a rotary shaft, side by side in an axial direction of the rotary shaft in a shaft case. Each stator held on the shaft case is interposed between the two adjacent brake discs. A piston plate facing the brake disc at an outermost end is held on the shaft case in which a pressing mechanism to press the piston plate is disposed. The pressing mechanism includes a fulcrum shaft, a fork, a tilt lever, and an operation lever connected to a wire. The fulcrum shaft crosses below the rotary shaft. The fork, which works as a pressing member, is mounted on the fulcrum shaft. The tilt lever is fixed on an end portion of the fulcrum shaft. The operation lever activates the tilt lever to move simultaneously when operated.

According to the parking brake device disclosed in the Publication, a plate pressing mechanism having a fulcrum shaft and a fork rotating with the fulcrum shaft as a fulcrum needs to be mounted in a shaft case. One idea for the mounting of the pressing mechanism in the shaft case is to form an opening in a side of the shaft case. The opening needs to be large enough to insert the fulcrum shaft and the fork therethrough from the direction perpendicular to the axial direction of a rotary shaft. However, in the case in which the opening is formed in a side of the shaft case, expansion of the opening is inevitable for the above reason, decreasing the strength of the shaft case. Generally speaking, the strength of a shaft case having an opening decreases as the size of the opening increases. In the above case, the shaft case is configured to be large enough to form the opening in the side of the shaft case. This configuration increases a space required for mounting the shaft case. If such a space is limited by other components, it may be impossible to form the opening.

The present disclosure has been made in view of the above circumstances and is directed to providing a wet parking brake device and a method of assembling the wet parking brake device which maintain the required strength of a shaft case without any limitation of the space for mounting the shaft case.

SUMMARY

In accordance with an aspect of the present disclosure, there is provided a wet parking brake device that includes a shaft case, a rotary shaft, a plurality of stators, a plurality of brake discs, a piston member and a pressing mechanism. The rotary shaft is accommodated in the shaft case. The plurality of stators are held on the shaft case and arranged side by side movably in an axial direction of the rotary shaft. The plurality of brake discs are held on the rotary shaft and each of which is interposed between any two adjacent stators of the plurality of stators. The piston member is held on the shaft case and is movable toward the brake discs in the axial direction of the rotary shaft. The pressing mechanism is configured to press the piston member toward the brake discs. The wet parking brake device is configured such that the brake discs and the stators come in contact with each other by a pressure from the piston member pressed by the pressing mechanism to thereby generate a braking force against the rotary shaft. The pressing mechanism includes a parking rod which is turnably supported in the shaft case. The parking rod includes a rod main body, a turning shaft portion, and a connecting shaft. The rod main body has a pressing portion configured to press the piston member. The turning shaft portion is located on an upper part or a lower part of the rod main body. The connecting shaft is fitted to the turning shaft portion by a spline joint and turnably inserted in the shaft case. The shaft case includes an opening extending in the axial direction of the rotary shaft and a shaft hole having a diameter which is larger than a diameter of the turning shaft portion such that the connecting shaft is inserted into the shaft hole. A length of the parking rod, the diameter of the shaft hole and the diameter of the turning shaft portion are respectively designed such that the turning shaft portion is inserted into the shaft hole when the parking rod is inserted from the opening.

In accordance with another aspect of the present disclosure, there is provided a method of assembling the wet parking brake device that includes a shaft case, a rotary shaft, a plurality of stators, a plurality of brake discs, a piston member and a pressing mechanism. The rotary shaft is accommodated in the shaft case. The plurality of stators are held on the shaft case and arranged side by side movably in an axial direction of the rotary shaft. The plurality of brake discs are held on the rotary shaft and each of which is interposed between two adjacent stators. The piston member is held on the shaft case and is movable toward the brake discs in the axial direction of the rotary shaft. The pressing mechanism is configured to press the piston member toward the brake discs. The method of assembling the wet parking brake device is configured such that the brake discs and the stators come in contact with each other by a pressure from the piston member pressed by the pressing mechanism to thereby generate a braking force against the rotary shaft. The pressing mechanism includes a parking rod which is turnably supported in the shaft case. The parking rod includes a rod main body, a turning shaft portion, and a connecting shaft. The rod main body has a pressing portion configured to press the piston member. The turning shaft portion is located on an upper part or a lower part of the rod main body. The connecting shaft is fitted to the turning shaft portion by a spline joint and turnably inserted in the shaft case. The shaft case includes an opening extending in the axial direction of the rotary shaft and a shaft hole having a diameter which is larger than a diameter of the turning shaft portion such that the connecting shaft is inserted into the shaft hole. A length of the parking rod, the diameter of the shaft hole and the diameter of the turning shaft portion are respectively designed such that the turning shaft portion is inserted into the shaft hole when the parking rod is inserted from the opening. The method includes inserting the parking rod from the opening, inserting the turning shaft portion through the shaft hole and fitting the connecting shaft to the turning shaft portion by a spline joint.

Other aspects and advantageous of the disclosure will become apparent from the following description, taken in conjunction with the accompanying drawings, illustrating by way of example the principles of the disclosure.

BRIEF DESCRIPTION OF THE DRAWINGS

The disclosure, together with objects and advantages thereof, may best be understood by reference to the following description of the embodiments together with the accompanying drawings in which.

DETAILED DESCRIPTION OF THE EMBODIMENTS

First Embodiment

The following will describe a wet parking brake device and a method of assembling the wet parking brake device according to a first embodiment of the present disclosure with reference to the accompanying drawings. The wet parking brake device according to the first embodiment is applied to the wet parking brake device mounted on a forklift as an industrial vehicle. The front and rear, the left and right, and the upper and lower, which words define the direction, are determined on the basis of the state in which an operator of the forklift sits down on a driver's seat and looks at the direction to which the forklift moves forward.

Figure 1:
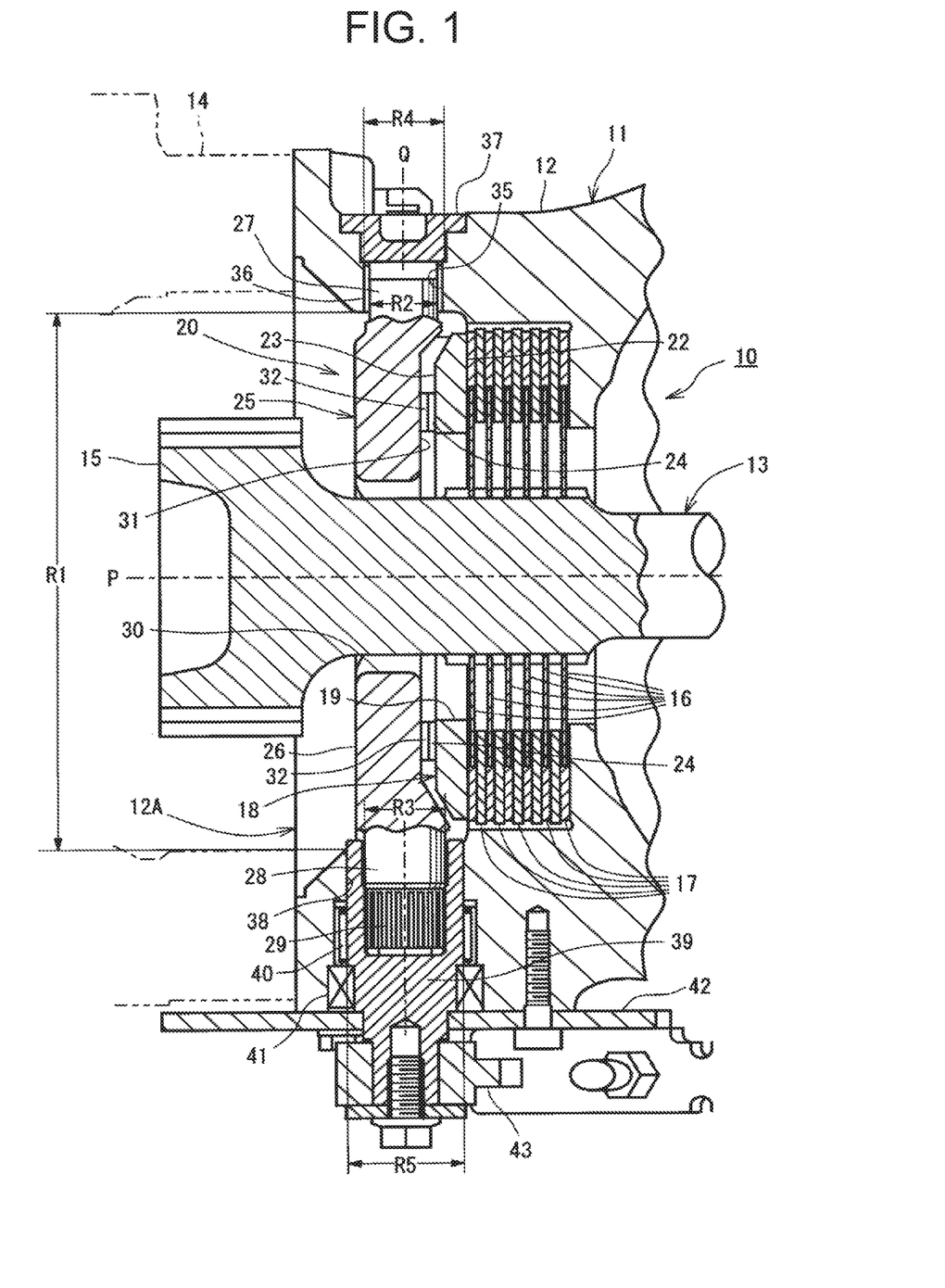
FIG. 1 is a longitudinal sectional view of a wet parking brake device according to a first embodiment of the present disclosure.

As shown in FIG. 1, a wet parking brake device 10 is provided in a shaft case 12 of a front axle 11. A rotary shaft 13 is accommodated in the shaft case 12. A central axis P of the rotary shaft 13, which is inserted through the shaft case 12, extents in the width direction of the forklift. The rotary shaft 13 is an input shaft which transmits the torque from a driving source (not shown) to drive wheels (not shown) by using a differential mechanism (not shown). The shaft case 12 has on the drive wheel side thereof an opening 12A extending in the axial direction of the rotary shaft 13. A wheel side case 14 is connected on an end surface of the shaft case 12. The front axle 11 sealed with the shaft case 12 and with the wheel side case 14 is filled with lubrication oil. The opening 12A according to the first embodiment has a diameter R1 of 167.0 mm.

As shown in FIG. 1, one end portion of the rotary shaft 13 on the drive wheels side includes a cylindrical portion 15 formed in a cylindrical shape. The other end portion of the rotary shaft 13 is connected to the differential mechanism. On an outer peripheral surface of the rotary shaft 13 in the shaft case 12, a plurality of brake discs 16, each of which has a perforated disc shape, are disposed by a spline joint. These brake discs 16 have friction surfaces perpendicular to the axial direction of the rotary shaft 13. The brake discs 16, which are held by a spline joint on the outer peripheral surface of the rotary shaft 13, are movable in the axial direction of the rotary shaft 13 and are held thereon so as to prevent the relative rotation to the rotary shaft 13. Thus, the brake discs 16 rotate integrally with the rotary shaft 13 during the rotation of the rotary shaft 13.

On the inner wall surface of the shaft case 12, a plurality of stators 17, each of which has a perforated disc shape, are disposed. These stators 17 are arranged side by side in the axial direction of the rotary shaft 13 in the shaft case 12, and have friction surfaces perpendicular to the axial direction of the rotary shaft 13. A locking claw (not shown) is formed in an outer peripheral edge of each stator 17. The plurality of the stators 17 are held on the shaft case 12 by the locking claws. The locking claws prevent the stators 17 from rotating in the rotation direction of the rotary shaft 13 relative to the shaft case 12. In the inner wall of the shaft case 12, grooves (not shown) corresponding to the locking claws of the stators 17 are formed along the axial direction of the rotary shaft 13. Thus, the stators 17 are movable in the axial direction of the rotary shaft 13.

The brake discs 16 and the stators 17 are disposed alternatively in the axial direction of the rotary shaft 13. This means that each of the brake discs 16 is interposed between two adjacent stators 17. The friction surfaces of the brake discs 16 and the friction surfaces of the stators 17 face each other. Of the plurality of the stators 17, the stator 17 that is closest to the wheels faces a piston plate 18, which has a perforated disc shape and is provided in the inner wall surface of the shaft case 12.

Figure 2:
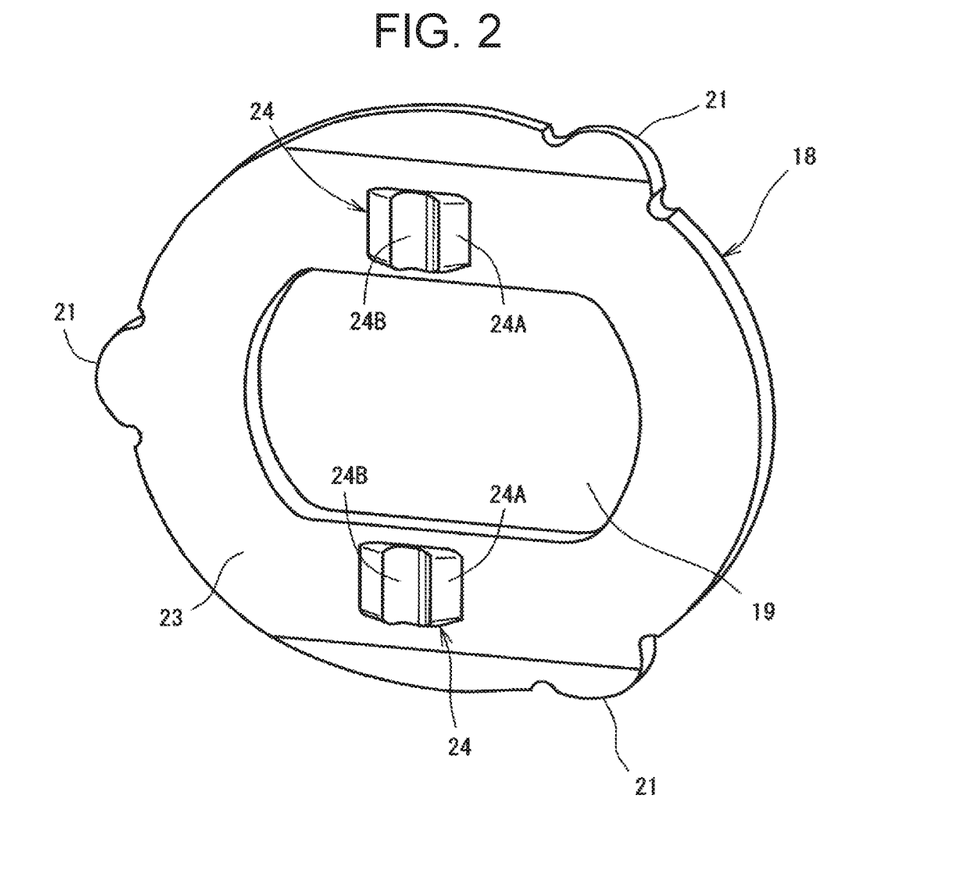
FIG. 2 is a perspective view of a piston plate of the wet parking brake device according to the first embodiment of the present disclosure.

The piston plate 18 corresponds to the piston member and has a through hole 19 through which the rotary shaft 13 is inserted. The piston plate 18 is movable toward the brake discs 16 in the axial direction of the rotary shaft 13 relative to the shaft case 12. A pressing mechanism 20 to be described later presses the piston plate 18 toward the brake discs 16. As shown in FIG. 2, in an outer peripheral edge of the piston plate 18, a plurality of locking claws 21 are provided like the stators 17. When the locking claws 21 are inserted into the corresponding grooves for the locking claw formed in the shaft case 12, the piston plate 18 is held on the shaft case 12, so that the rotation of the piston plate 18 in the rotation direction of the rotary shaft 13 relative to the shaft case 12 is prevented. The outline of the outer peripheral edge in the piston plate 18 in the radial direction of the rotary shaft 13, is the same as that of the stators 17. An urging member (not shown) which urges the piston plate 18 toward the wheel side is mounted on the piston plate 18.

A plate surface 23 opposed to a plate surface 22 of the piston plate 18 facing the brake discs 16 includes a pair of pressed portions 24. One of the pressed portions 24 is located in the upper side of the through hole 19, and the other is located in the lower side of the through hole 19. The pressed portions 24 are pressed by the pressing mechanism 20. Each of the pressed portions 24 of the first embodiment is formed of a projection 24A projecting from the plate surface 23. The projection 24A has a recessed curve surface 24B having an arched cross section. The upper and lower recessed curve surfaces 24B are coaxial with each other, that is, the centers of the upper and lower recessed curve surfaces 24B in the radial direction coincide with each other.

The pressing mechanism 20 is configured to press the piston plate 18 by operation of a parking lever (not shown), so that the brake discs 16 and the stators 17 come in contact with each other by the pressure from the piston plate 18 pressed by the pressing mechanism 20. This contact generates the braking force against the rotary shaft 13. The pressing mechanism 20 includes a parking rod 25 which is turnably supported in the shaft case 12. The parking rod 25 includes a rod main body 26, an upper shaft portion 27 located on an upper part of the rod main body 26, and a lower shaft portion 28 located on a lower part of the rod main body 26. The upper shaft portion 27 and the lower shaft portion 28 correspond to turning shaft portions. The parking rod 25 of the first embodiment is manufactured by forging.

Figure 3:
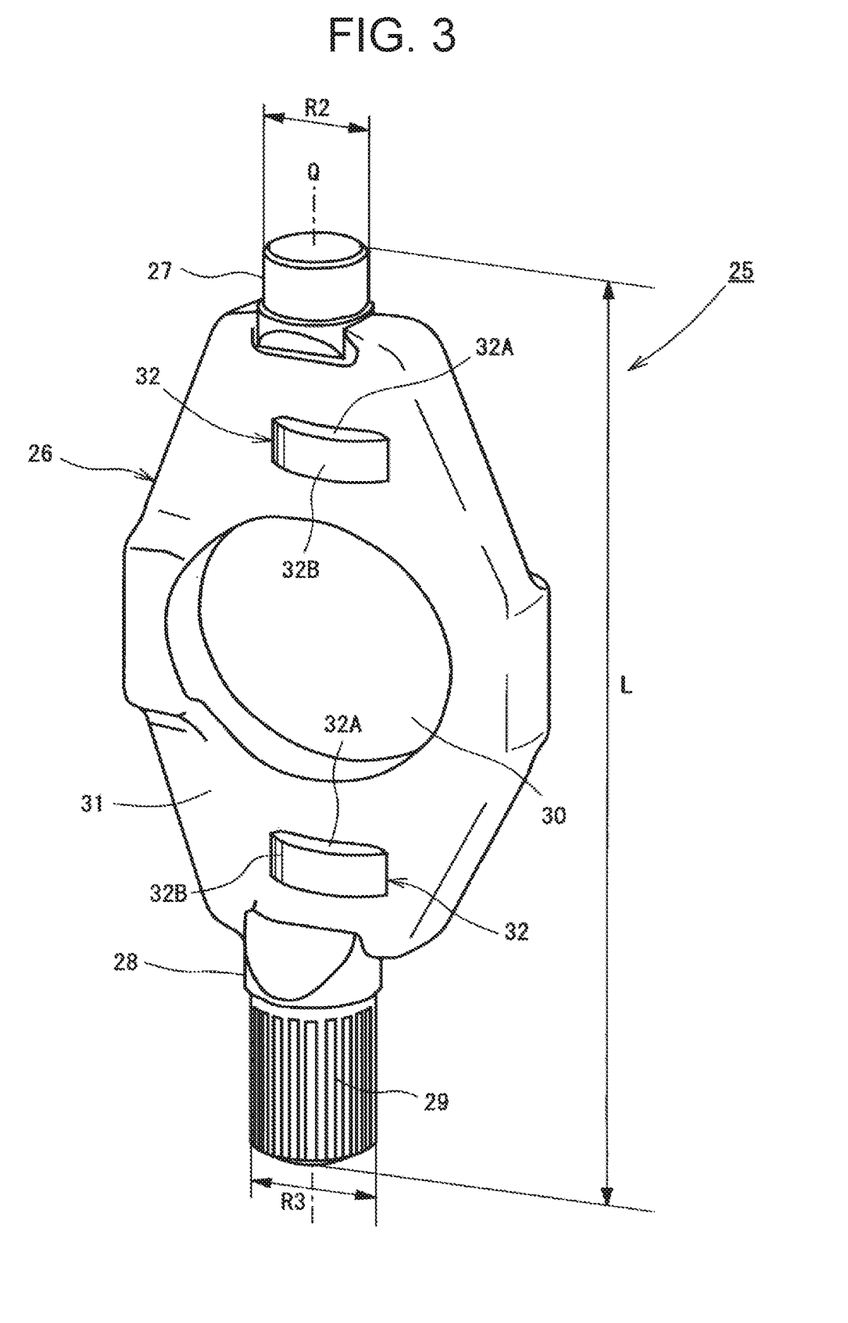
FIG. 3 is a perspective view of a parking rod of the wet parking brake device according to the first embodiment of the present disclosure.

FIG. 3 is a perspective view of the parking rod 25 viewed from the side of the piston plate 18. As shown in FIG. 3, a diameter R2 of the upper shaft portion 27 is 20.0 mm and a diameter R3 of the lower shaft portion 28 is 23.8 mm. A length L of the parking rod 25 is about 1.28 times the diameter R1 of the opening 12A formed in the shaft case 12 (R1<L). In the first embodiment of the present disclosure, the length L is 213.5 mm. The rod main body 26 has a shape in which a length in the vertical direction (a longitudinal direction) is longer than a length in the horizontal direction (a short direction). The shape of the rod main body 26 is formed so as not to interfere with the rotary shaft 13 under braking operation and non-braking operation. The rod main body 26 has in the center thereof an insertion hole 30 through which the rotary shaft 13 is inserted. In an opposite surface 31 of the rod main body 26 facing the piston plate 18, a pair of pressing portions 32 is provided in the upper and lower sides of the rod main body 26 across the insertion hole 30. The pressing portions 32 press the pressed portions 24 in the plate surface 23 of the piston plate 18 to generate the braking force. Therefore, the upper and lower pressing portions 32 are located to be contactable with the upper and lower pressed portions 24, respectively.

Figure 4:
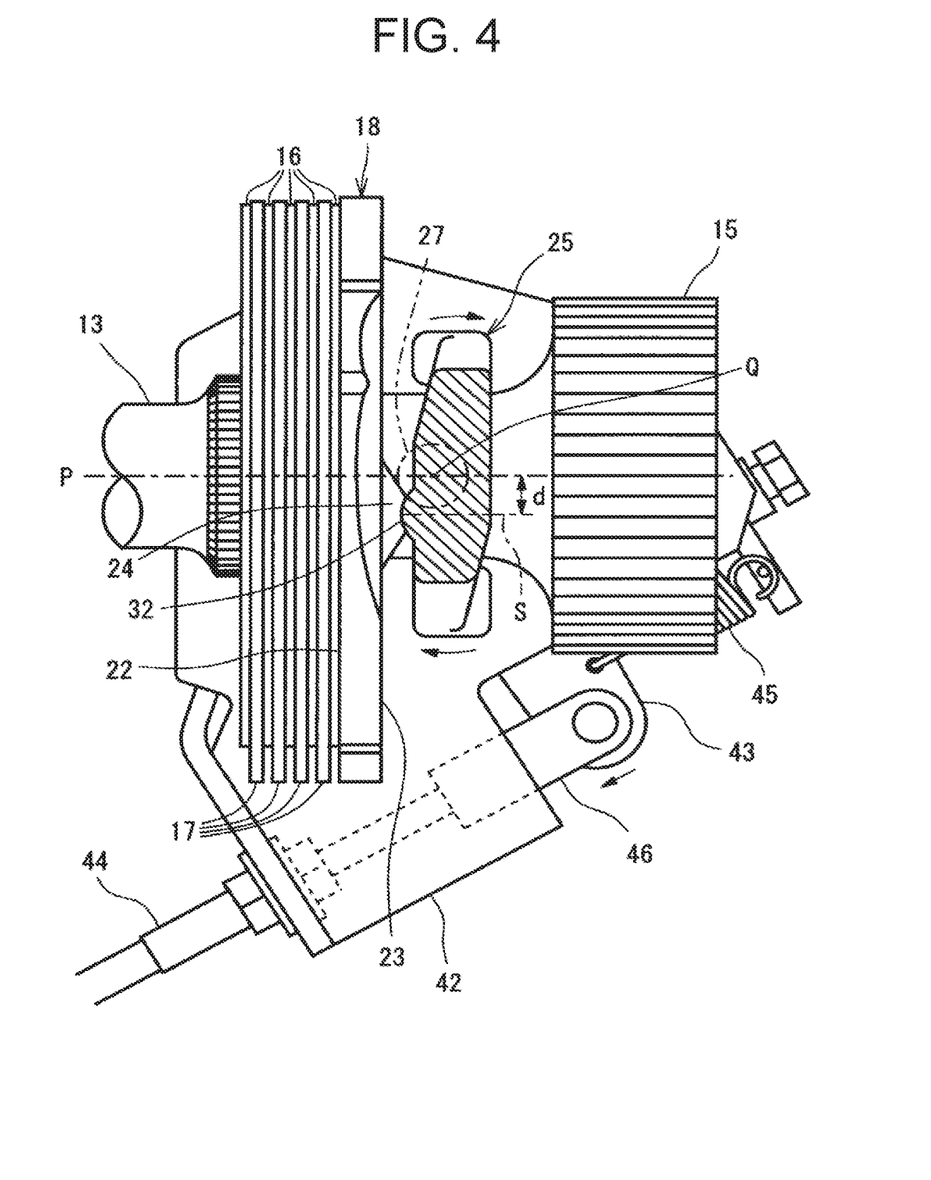
FIG. 4 is a plan view showing a main part of the wet parking brake device during braking operation according to the first embodiment of the present disclosure.

Each of the pressing portions 32 according to the first embodiment is formed of a protrusion 32A protruding from the opposite surface 31. Each protrusion 32A has a protruded curve surface 32B having an arched cross section. The upper and lower protruded curve surfaces 32B are coaxial with each other, that is, the centers of the upper and lower protruded curve surfaces 32B in the radial direction coincide with each other. As shown in FIG. 4, an axial straight line S passes through the center of the recessed curve surfaces 24B in the horizontal direction. In a state in which the protruded curve surfaces 32B are in contact with the recessed curve surfaces 24B, the protruded curve surfaces 32B are offset against the central axis P of the rotary shaft 13 by the distance d between the central axis P and the straight line S.

The upper shaft portion 27 located on the upper part of the rod main body 26 is coaxial with the lower shaft portion 28 located on the lower part of the rod main body 26. An upper shaft hole 35 is formed in the upper part of the shaft case 12 through which the upper shaft portion 27 is inserted. The upper shaft hole 35 is a through hole through which the inner and outer sides of the shaft case 12 are communicated. A diameter R4 of the upper shaft hole 35 as shown in FIG. 1 is 23.0 mm. The upper shaft portion 27 is turnably inserted into the shaft case 12 via a metal bush 36. The upper shaft hole 35 is sealed by a plug 37 from the outside of the shaft case 12.

The shaft case 12 has in the lower part thereof a lower shaft hole 38 that is located to be coaxial with the upper shaft hole 35. The upper and lower shaft holes 35 and 38 correspond to a shaft hole. The lower shaft hole 38 is a through hole through which the inner and outer sides of the shaft case 12 are communicated. A diameter R5 of the lower shaft hole 38 as shown in FIG. 1 is 34.0 mm. Therefore, the diameter R5 of the lower shaft hole 38 is about 1.43 times larger than the diameter R3 of the lower shaft portion 28 (R3<R5). The lower shaft portion 28, which has spline teeth 29, is inserted into the lower shaft hole 38, and then a connecting shaft 39 which is inserted into the lower shaft hole 38 is fitted to the lower shaft portion 28 by a spline joint. The lower shaft hole 38 has a diameter which is designed to be fitted to the outer diameter of the connecting shaft 39. The lower shaft hole 38 includes a needle bearing 40 and a seal member 41. The connecting shaft 39 is turnably inserted in the shaft case 12 via the needle bearing 40. The seal member 41 prevents leakage of the lubrication oil from the connecting shaft 39 and mixing of foreign matter into the lubrication oil. The parking rod 25 is turnable relative to the shaft case 12 around a central axis Q of the upper shaft portion 27 and the lower shaft portion 28. This means the central axis Q is a turning axis of the parking rod 25.

Figure 5:
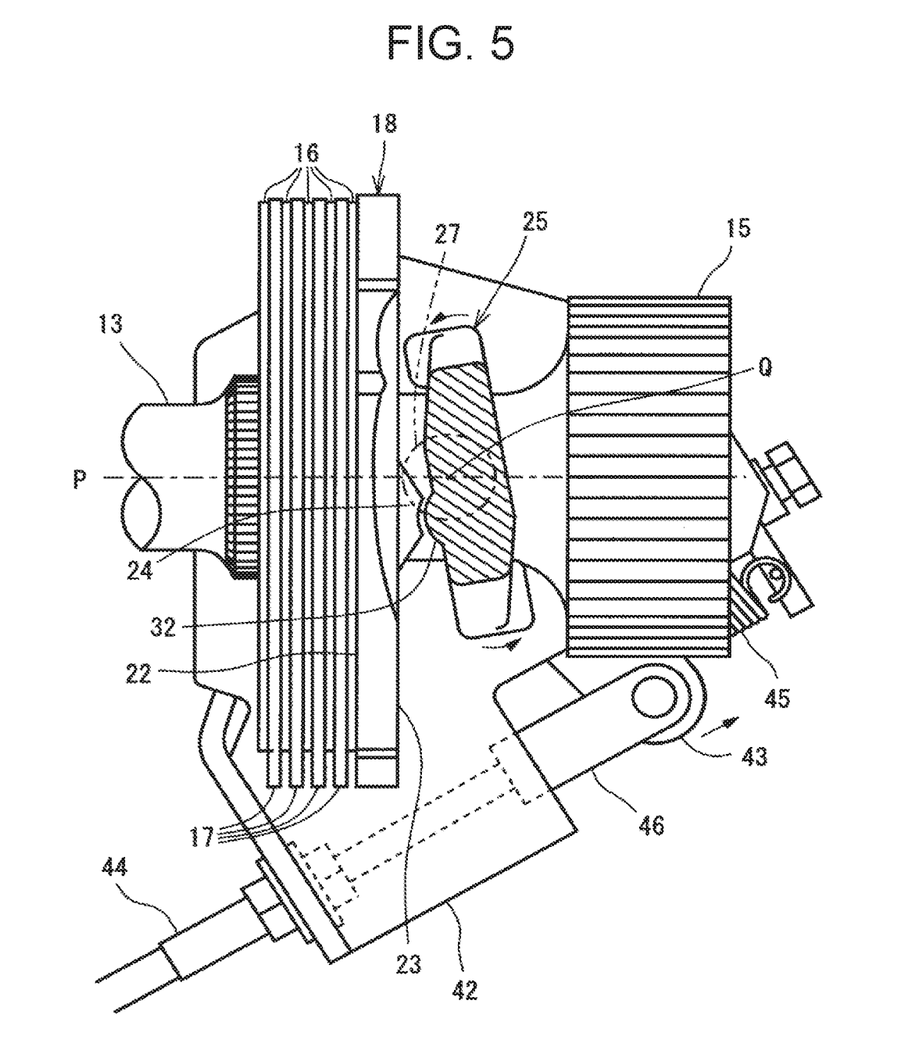
FIG. 5 is a plan view showing the main part of the wet parking brake device during braking releasing operation according to the first embodiment of the present disclosure.

As shown in FIG. 1, a supporting plate 42 is attached on the lower part of the shaft case 12. The supporting plate 42, which projects out from the shaft case 12, has a horizontal surface. The connecting shaft 39 connected to the parking rod 25 penetrates through the supporting plate 42 downwardly. On the lower end of the connecting shaft 39, an arm member 43 extending in the radial direction of the connecting shaft 39 is fixed. As shown in FIGS. 4 and 5, an end portion of the arm member 43 is connected to one end of the wire 44 via a clevis 46. The other end of the wire 44 is connected to a parking lever or a parking pedal which is mounted to the driver's seat. Thus, the arm member 43 turns around the central axis Q of the upper shaft portion 27 and the lower shaft portion 28 of the parking rod 25 by operation of the parking lever. In the first embodiment, the turning angle of the arm member 43 is about 10 degrees. The supporting plate 42 and the arm member 43 are connected by a coil spring 45, which works as an urging member. When the braking state is released, the coil spring 45, which is an extension spring, urges the arm member 43 in a direction of returning to an original position. For the ease of explanation, the illustration of the shaft case 12 is omitted in FIGS. 4 and 5.

Figure 6:
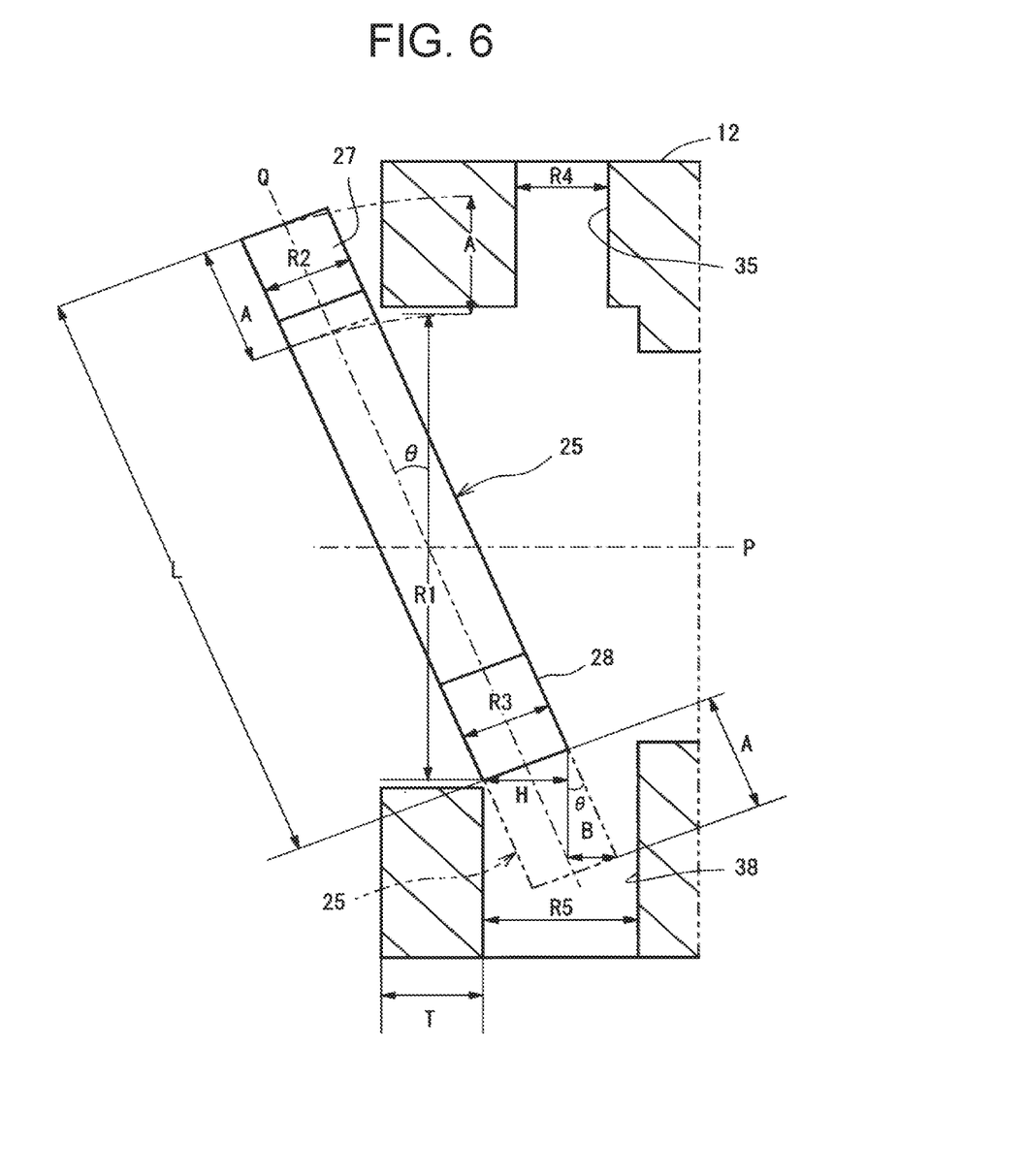
FIG. 6 is an illustration describing a condition capable of inserting the parking rod according to the first embodiment of the present disclosure.

The following describes a condition for inserting the parking rod 25 into the shaft case 12 with reference to FIG. 6. For the ease of explanation, illustrations of the shaft case 12 and the parking rod 25 are simply illustrated in FIG. 6. Diameters of the opening 12A of the shaft case 12, the upper shaft hole 35, and the lower shaft hole 38 are R1, R4, and R5, respectively. The length of the parking rod 25 is L. Diameters of the upper shaft portion 27 and the lower shaft portion 28 of the parking rod 25 are R2 and R3, respectively. The distance between an end surface of the shaft case 12 on the drive wheel side and the lower shaft hole 38 is denoted as T.

In FIG. 6, when a tilt angle of the parking rod 25 with respect to the vertical direction is θ, the lower shaft portion 28 of the parking rod 25 is allowed to be inserted into the shaft case 12. The tilt angle θ is the minimum angle, where the diameter of the opening 12A is R1 and the distance is T.

Under a constant dimensional condition of the parking rod 25, the tilt angle θ increases as the diameter R1 decreases or the distance T increases. With the tilt angle of θ, the parking rod 25 is moved obliquely downward by a distance A such that the lower shaft portion 28 of the parking rod 25 is inserted into the lower shaft hole 38, thereby enabling to eliminate inclination of the parking rod 25 against the vertical direction. The distance A is equal to a value subtracting the diameter R1 of the opening 12A from the length L of the parking rod 25 (A=L-R1). In FIG. 6, the parking rod 25 having been moved by the distance A is illustrated by a double-dashed line.

With the tilt angle of θ, before the parking rod 25 is moved by the distance A, a distance in the axial direction of the rotary shaft 13 between the lowermost end of the lower shaft portion 28 and a portion of the parking rod 25 that is closest to the differential mechanism is denoted as H. The movement of the parking rod 25 by the distance A inserts the lower shaft portion 28 into the lower shaft hole 38. In response to the movement, the portion of the parking rod 25 that is closest to the differential mechanism is moved by a distance B in the axial direction of the rotary shaft 13. Therefore, with the tilt angle of θ, if the diameter R5 of the lower shaft hole 38 is larger than the sum of the distance H and the distance B, the parking rod 25 is movable by the distance A such that the lower shaft portion 28 of the parking rod 25 is inserted into the lower shaft hole 38, thereby enabling to eliminate inclination of the parking rod 25 against the vertical direction.

The diameter R5 of the lower shaft hole 38 is formed to be larger than the sum of the distance H and the distance B. This relation is expressed by the following Equation (1).

$$R5 > H + B \quad \text{Equation (1)}$$

As shown in FIG. 6, $$H = R3 \cos\theta \text{ and } B = A \sin\theta$$

are substituted to the Equation (1), resulting in the following Equation (2).

$$R5 > R3 \cos\theta + A \sin\theta \quad \text{Equation (2)}$$

When Equation (2) is satisfied, the parking rod 25 is movable obliquely downward by the distance A such that the lower shaft portion 28 of the parking rod 25 is inserted into the lower shaft hole 38, thereby enabling to eliminate inclination of the parking rod 25 against the vertical direction. Therefore, the length L of the parking rod 25, the diameter R5 of the lower shaft hole 38, and the diameter R3 of the lower shaft portion 28 are respectively designed such that the lower shaft portion 28 is inserted into the lower shaft hole 38 when the parking rod 25 is inserted from the opening 12A.

Figure 7A:
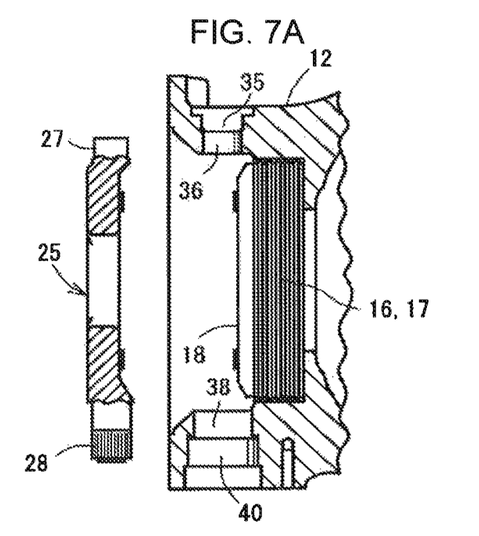
FIGS. 7A-7D are longitudinal sectional views showing an assembly process of the parking rod according to the first embodiment of the present disclosure.

The following will describe a method of assembling the wet parking brake device 10 according to the first embodiment. As shown in FIG. 7A, the plurality of the stators 17 are assembled to the shaft case 12 which does not yet have the parking rod 25 therein. Each brake disc 16 is interposed between two adjacent stators 17. The piston plate 18 is assembled to the stator 17 at the end near the opening 12A in the shaft case 12. The metal bush 36 is mounted in the upper shaft hole 35, and the needle bearing 40 are mounted in the lower shaft hole 38.

Figure 7B:
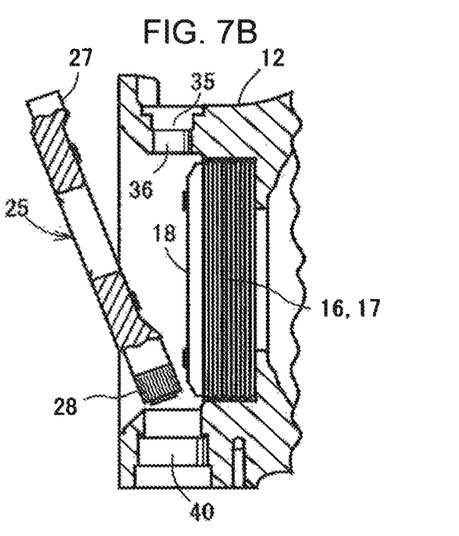
Figure 7C:
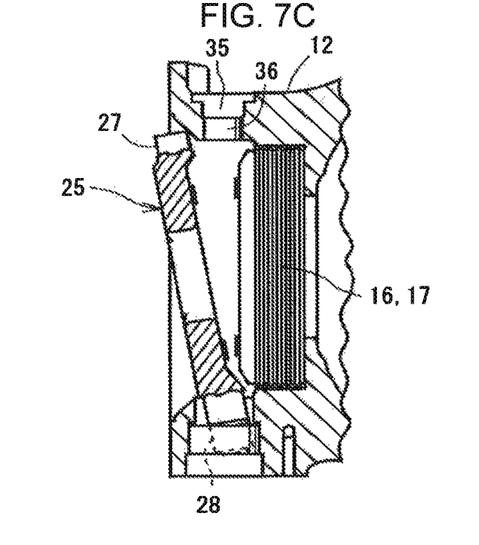

Firstly, as shown in FIG. 7B, an operator inclines the parking rod 25 relative to the vertical direction in the longitudinal direction, and then inserts the lower shaft portion 28 into the opening 12A before any portion of the parking rod 25. As shown in FIG. 7C, while bringing the parking rod 25 close to the piston plate 18, the operator inserts the lower shaft portion 28 into the lower shaft hole 38. While inserting the lower shaft portion 28 into the lower shaft hole 38, the operator changes the posture of the parking rod 25 to a direction in which the longitudinal direction of the parking rod 25 coincides with the vertical direction. The lower shaft portion 28 is inserted through the lower shaft hole 38 into the needle bearing 40, whereas the upper shaft portion 27 of the parking rod 25 is moved to a position under the upper shaft hole 35. When the upper shaft portion 27 is located under the upper shaft hole 35, the longitudinal direction of the parking rod 25 nearly extends in the vertical direction.

Figure 7D:
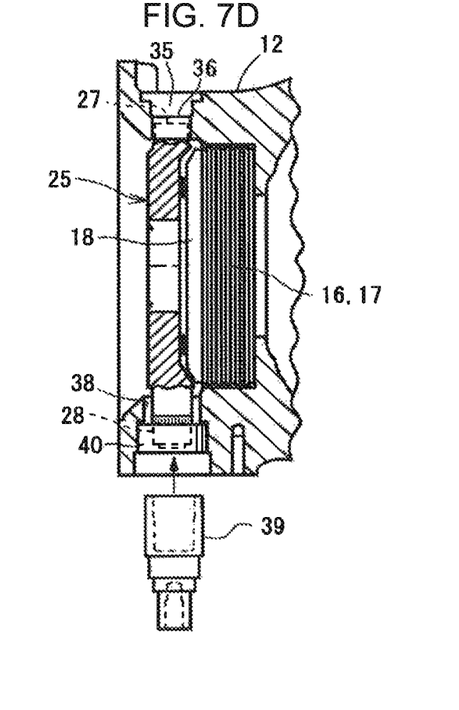

Secondly, the operator raises the parking rod 25 and inserts the upper shaft portion 27 of the parking rod 25 into the upper shaft hole 35. The upper shaft portion 27 is inserted through the upper shaft hole 35 into the metal bush 36 as shown in FIG. 7D. After the upper shaft portion 27 is inserted into the metal bush 36, the operator inserts the connecting shaft 39 into the lower shaft hole 38 from the other end thereof. The connecting shaft 39 is inserted through the lower shaft hole 38 to be fitted to the lower shaft portion 28 by a spline joint with the connecting shaft 39 inserted into the needle bearing 40. The lower end portion of the connecting shaft 39 protrudes from the shaft case 12.

In this step, the assembling of the parking rod 25 in the shaft case 12 has been completed. Although an illustration is omitted, the operator inserts the seal member 41 into the lower shaft hole 38, and then fixes the supporting plate 42 to the shaft case 12. The operator fixes the arm member 43 to the lower end portion of the connecting shaft 39 protruding downwardly from the supporting plate 42. After a step of mounting the plug 37 on the shaft case 12, the wire 44, the coil spring 45, and the clevis 46 on the arm member 43, the assembly of the pressing mechanism 20 is completed. Finally, the rotary shaft 13 is assembled to the pressing mechanism 20, thereby to complete the assembly of the wet parking brake device 10.

The following will describe the operation of the wet parking brake device 10 according to the first embodiment. When an operator of the forklift operates the parking lever or the parking pedal to set the wet parking brake device 10 in a braking state, the arm member 43 is caused to turn around the central axis Q of the parking rod 25. As indicated by arrows in FIG. 4, in response to the clockwise turning of the arm member 43, the parking rod 25 turns clockwise.

The turning of the parking rod 25 causes the parking rod 25 to press the piston plate 18. The rod main body 26 has the pressing portions 32 configured to press the pressed portions 24 of the piston plate 18. When the parking rod 25 presses the piston plate 18, the piston plate 18 moves in the axial direction of the rotary shaft 13. The pressure from the piston plate 18 decreases the respective spaces between the stators 17 and the brake discs 16, and then the stators 17 and the brake discs 16 are brought into contact with each other. These contacts generate the braking force against the rotary shaft 13, and thus, the wet parking brake device 10 is set in the braking state. In the braking state, the central axis of the insertion hole 30 of the parking rod 25 coincides with the central axis P of the rotary shaft 13.

When an operator of the forklift operates the parking lever or the parking pedal to release the braking state of the wet parking brake device 10, the arm member 43 is caused to turn around the central axis Q of the parking rod 25. As indicated by allows in FIG. 5, in response to the counter-clockwise turning of the arm member 43, the parking rod 25 turns counter-clockwise. The parking rod 25 is detached from the piston plate 18, and then the piston plate 18 returns to an original position by the urging force of the urging member. Returning the piston plate 18 to the original position increases the respective spaces between the stators 17 and the brake discs 16 so as to release the braking state of the wet parking brake device 10. In a released state in which the braking force is released, the central axis of the insertion hole 30 of the parking rod 25 is inclined relative to the central axis P of the rotary shaft 13.

The wet parking brake device 10 and the method of assembling the wet parking brake device 10 of the first embodiment have the following advantageous effects.

(1) The operator inserts the parking rod 25 from the opening 12A into the shaft case 12 in the axial direction of the rotary shaft 13, and then inserts the lower shaft portion 28 of the parking rod 25 through the lower shaft hole 38. This configuration and the assembling method do not require a conventional opening on the side of the shaft case. Therefore, the wet parking brake device and the assembling method maintain the required strength of the shaft case 12 without any limitation of the space for mounting the shaft case 12.

(2) The parking rod 25 includes the rod main body 26 having the insertion hole 30 through which the rotary shaft 13 is inserted. The parking rod 25 is inserted from the opening 12A into the shaft case 12, and then the lower shaft portion 28 of the parking rod 25 is inserted into the lower shaft hole 38. Not only is such a parking rod 25 easier to be assembled in the shaft case 12 than a conventional parking rod, but also the parking rod 25 has superior function.

(3) The parking rod 25 is inserted from the opening 12A into the shaft case 12 in the axial direction of the rotary shaft 13, and then the lower shaft portion 28 of the parking rod 25 inserted into the opening 12A is inserted into the lower shaft hole 38. The operator fits the connecting shaft 39 to the lower shaft portion 28 by a spline joint in the lower shaft hole 38. This configuration and the assembling method do not require a conventional opening on the side of the shaft case. Therefore, it is possible to manufacture the wet parking brake device 10 that does not lower or maintain the required strength of the shaft case 12 without any limitation of the space for mounting the shaft case 12.

Second Embodiment

The following will describe a wet parking brake device and a method of assembling the wet parking brake device according to a second embodiment of the present disclosure with reference to the accompanying drawings. The wet parking brake device according to the second embodiment is applied to the wet parking brake device mounted on a forklift as an industrial vehicle, similar to the first embodiment. However, the wet parking brake device according to the second embodiment has a different configuration from that according to the first embodiment.

Figure 8:
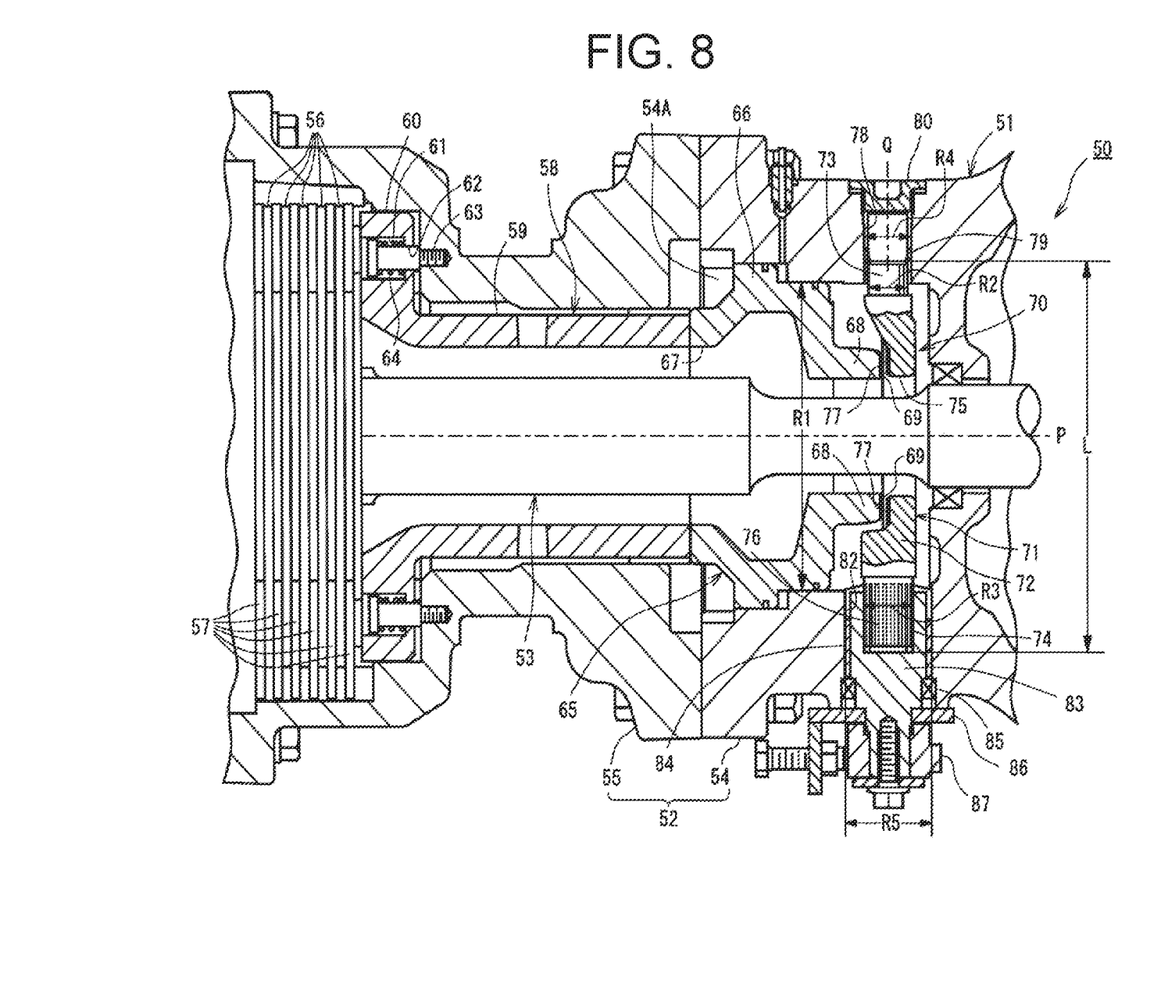
FIG. 8 is a longitudinal sectional view of a wet parking brake device according to a second embodiment of the present disclosure.

As shown in FIG. 8, a shaft case 52 of a front axle 51 includes a wet parking brake device 50. A rotary shaft 53 is accommodated in the shaft case 52. A central axis P of the rotary shaft 53, which is inserted through the shaft case 52, extends in the width direction of the forklift. The rotary shaft 53 is an input shaft which transmits the torque from a driving source (not shown) to drive wheels (not shown) by using a differential mechanism (not shown). The shaft case 52 includes a first shaft case portion 54 on the side of the differential mechanism and a second shaft case portion 55 on the drive wheel side connected to the first shaft case portion 54. An opening 54A is formed on the drive wheel side of the first shaft case portion 54 in the axial direction of the rotary shaft 53. On an end surface of the first shaft case portion 54, the second shaft case portion 55 is connected. The front axle 51 having the shaft case 52 is filled with lubrication oil. The opening 54A according to the second embodiment has a diameter R1 of 138.7 mm.

One end of the rotary shaft 53 is connected to one of the drive wheels, and the other end of the rotary shaft 53 is connected to the differential mechanism. On an outer peripheral surface of the rotary shaft 53 in the second shaft case portion 55, a plurality of brake discs 56, each of which has a perforated disc shape, are disposed by a spline joint. These brake discs 56 have friction surfaces perpendicular to the axial direction of the rotary shaft 53. The brake discs 56, which are held by a spline joint on the outer peripheral surface of the rotary shaft 53, are movable in the axial direction of the rotary shaft 53 and are held thereon so as to prevent the relative rotation to the rotary shaft 53. Thus, the brake discs 56 rotate integrally with the rotary shaft 53 during the rotation of the rotary shaft 53.

On the inner wall surface of the second shaft case portion 55, a plurality of stators 57, each of which has a perforated disc shape, are disposed. These stators 57 are arranged side by side in the axial direction of the rotary shaft 53 in the second shaft case portion 55, and have friction surfaces perpendicular to the axial direction of the rotary shaft 53. In an outer peripheral edge (not shown) of each stator 57, a locking claw is formed. The plurality of the stators 57 are held on the second shaft case portion 55 by the locking claws. The locking claws prevent the stators 57 from rotating in the rotation direction of the rotary shaft 53 relative to the shaft case 52. In the inner wall of the second shaft case portion 55, grooves (not shown) corresponding to the locking claws of the stators 57 are formed along the axial direction of the rotary shaft 53. Thus, the stators 57 are movable in the axial direction of the rotary shaft 53.

The brake discs 56 and the stators 57 are disposed alternatively in the axial direction of the rotary shaft 53. This means that each of the brake discs 56 is interposed between two adjacent stators 57. The friction surfaces of the brake discs 56 and the friction surfaces of the stators 57 face each other. The stator 57 that is closest to the differential mechanism faces a push cylinder 58, which is provided in the second shaft case portion 55.

The push cylinder 58 includes a cylinder main body 59 which has a cylindrical shape and a flange portion 60 formed in one end portion of the cylinder main body 59 on the side of stators 57. A plurality of recesses 61 are formed in an end surface of the flange portion 60. A through hole 62 is formed through a bottom portion of each recess 61 in the axial direction of the rotary shaft 53. A bolt 63 is inserted through each recess 61 and the through hole 62 to be fixed to the second shaft case portion 55. A central axis of the bolt 63 is parallel to a central axis P of the rotary shaft 53. A coil spring 64 is mounted between a head portion of each bolt 63 and a bottom portion of each recess 61 of the flange portion 60. The coil spring 64 applies urging force to the push cylinder 58 to urge the push cylinder 58 toward the first shaft case portion 54. The push cylinder 58 is movable toward the brake discs 56 in the axial direction of the rotary shaft 53 by pressure of a hollow piston 65 to be described in detail later.

The hollow piston 65 and the push cylinder 58 cooperate to form the piston member of the present disclosure. The first shaft case portion 54 includes the hollow piston 65 which is movable toward the brake discs 56 in the axial direction of the rotary shaft 53 in the first shaft case portion 54. The hollow piston 65 is configured of a piston main body 66, a through hole 67, and a pair of protrusions 68. The through hole 67 through which the rotary shaft 53 is inserted is formed in the piston main body 66. Each protrusion 68 is located in the upper and lower sides of the piston main body 66 and protrudes toward the differential mechanism. The protrusion 68 is configured to receive a pressure by a pressing mechanism 70. The hollow piston 65 is held on the first shaft case portion 54 by a rotation prevention mechanism (not shown) that is configured to prevent the hollow piston 65 from rotating in the rotation direction of the rotary shaft 53 against the first shaft case portion 54. An end portion of each protrusion 68 of the hollow piston 65 serves as a pressed portion 69. The pressed portion 69 is configured to be pressed by the pressing mechanism 70.

The pressing mechanism 70 is configured to press the hollow piston 65 toward the brake discs 56 by operation of a parking lever (not shown), so that the brake discs 56 and the stators 57 come into contact with each other by the pressure through the push cylinder 58 from the hollow piston 65 pressed by the pressing mechanism 70. This contact generates the braking force against the rotary shaft 53. The pressing mechanism 70 includes a parking rod 71 which is turnably supported in the first shaft case portion 54. The parking rod 71 includes a rod main body 72, an upper shaft portion 73 located on an upper part of the rod main body 72, and a lower shaft portion 74 located on a lower part of the rod main body 72. The upper shaft portion 73 and the lower shaft portion 74 correspond to a turning shaft portion. The parking rod 71 of the second embodiment is manufactured by forging.

A diameter R2 of the upper shaft portion 73 is 20.0 mm. A diameter R3 of the lower shaft portion 74 is 23.8 mm. According to the second embodiment, a length L of the parking rod 71 is 175.7 mm. The length L of the parking rod 71 is about 1.27 times the diameter R1 of the opening 54A formed in the first shaft case portion 54 (R1<L). The rod main body 72 has a shape in which a length in the vertical direction is longer than a length in the horizontal direction. The shape of the rod main body 72 is formed so as not to interfere with the rotary shaft 53 under braking operation and non-braking operation. The rod main body 72 has in the center thereof an insertion hole 75 through which the rotary shaft 13 is inserted. In an opposite surface of the rod main body 72 facing the hollow piston 65, a pair of pressing portions 77 is provided in the upper and lower sides of the rod main body 72 across the insertion hole 75. The pressing portions 77 press the pressed portions 69 to generate a braking force. Therefore, the upper and lower pressing portions 77 are located to be contactable with the upper and lower pressed portions 69, respectively. Although an illustration is not shown, the pressing portion 77 according to the second embodiment is offset against the central axis P of the rotary shaft 53 by a distance d, similar to the first embodiment.

The upper shaft portion 73 located on the upper part of the rod main body 72 is coaxial with the lower shaft portion 74 located on the lower part of the rod main body 72. The upper shaft hole 78 is formed in the upper part of the first shaft case portion 54 through which the upper shaft portion 73 is inserted. The upper shaft hole 78 is a through hole through which the inner and outer sides of the first shaft case portion 54 are communicated. A diameter R4 of the upper shaft hole 35 shown in FIG. 8 is 23.0 mm. The upper shaft portion 73 is turnably inserted into the first shaft case portion 54 via a metal bush 79. An upper shaft hole 78 is sealed by a plug 80 from the outside of the first shaft case portion 54.

The first shaft case portion 54 has in the lower part thereof a lower shaft hole 82 that is located to be coaxial with the upper shaft hole 78. The lower shaft hole 82 is a through hole through which the inner and outer sides of the first shaft case portion 54 are communicated. A diameter R5 of the lower shaft hole 82 shown in FIG. 8 is 42.0 mm. Therefore, the diameter R5 of the lower shaft hole 82 is about 1.83 times larger than the diameter R3 of the lower shaft portion 74 (R3<R5). The lower shaft portion 74, which has spline teeth 76, is inserted into the lower shaft hole 82, and then a connecting shaft 83 which is inserted into the loser shaft hole 82 is fitted to the lower shaft portion 74 by a spline joint. The lower shaft hole 82 has a diameter which is designed to be fitted to the outer diameter of the connecting shaft 83. The lower shaft hole 82 includes a metal bush 84 and a seal member 85. The connecting shaft 83 is turnably inserted in the first shaft case portion 54 via the metal bush 84. The seal member 85 prevents leakage of the lubrication oil from the connecting shaft 83 and mixing of foreign matter into the lubrication oil. The parking rod 71 is turnable relative to the first shaft case portion 54 around a central axis Q of the upper shaft portion 73 and the lower shaft portion 74. This means the central axis Q is a turning axis of the parking rod 71.

A supporting plate 86 is attached on the lower part of the first shaft case portion 54. The supporting plate 86, which projects out from the first shaft case portion 54, has a horizontal surface. The connecting shaft 83 connected to the parking rod 71 penetrates through the supporting plate 86 downwardly. On the lower end of the connecting shaft 83, an arm member 87 extending in the radial direction of the connecting shaft 83 is fixed. Although an illustration is not omitted, an end portion of the arm member 87 is connected to one end of a wire (not shown) via a clevis (not shown). The other end of the wire is connected to a parking lever or a parking pedal which is mounted to the driver's seat. Thus, the arm member 87 turns around the central axis Q of the upper shaft portion 73 and the lower shaft portion 74 of the parking rod 71 by operation of the parking lever. In the second embodiment, the turning angle of the arm member 87 is about 10 degrees. The supporting plate 86 and the arm member 87 are connected by a coil spring (not shown), which works as an urging member. When the braking state is released, the coil spring, which is an extension spring, urges the arm member 87 in a direction of returning to an original position. The clevis, the wire, and the coil spring mentioned above are the same components as those in the first embodiment.

A condition for inserting the parking rod 71 into the first shaft case portion 54 according to the second embodiment is the same as that of the first embodiment, so that the condition is fulfilled by satisfying Equations (1) and (2). Therefore, the length L of the parking rod 71, the diameter R5 of the lower shaft hole 82, and the diameter R3 of the lower shaft portion 74 are respectively designed such that the lower shaft portion 74 is inserted into the lower shaft hole 82 when the parking rod 71 is inserted from the opening 54A.

Figure 9A:
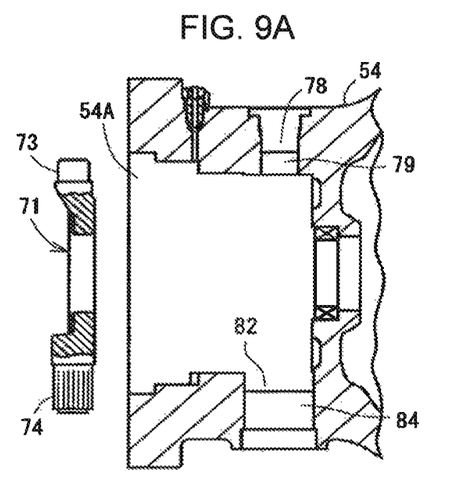
FIGS. 9A-9D are longitudinal sectional views showing an assembly process of a parking rod according to the second embodiment of the present disclosure.

The following will describe a method of assembling the wet parking brake device 50 according to the second embodiment. As shown in FIG. 9A, the first shaft case portion 54 of the shaft case 52 in which the parking rod 71 is not yet assembled is not connected to the second shaft case portion 55. In addition, the hollow piston 65 is not assembled in the first shaft case portion 54. The metal bush 79 is mounted in the upper shaft hole 78, and the metal bush 84 is mounted in the lower shaft hole 82.

Figure 9B:
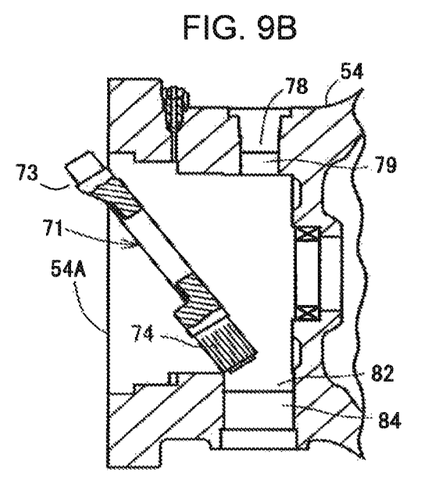
Figure 9C:
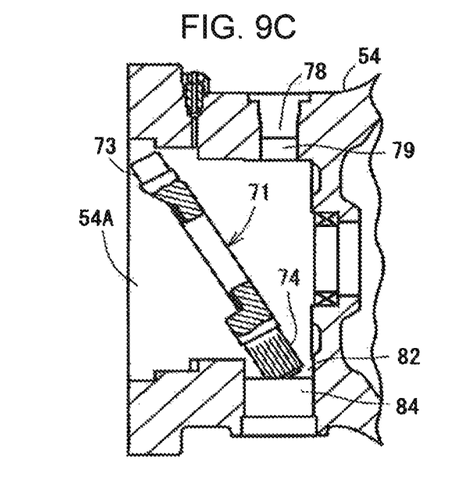

Firstly, as shown in FIG. 9B, an operator inclines the parking rod 71 relative to the vertical direction in the longitudinal direction, and then inserts the lower shaft portion 74 into the opening 54A before any portion of the parking rod 71. As shown in FIG. 9C, while inserting the whole parking rod 71 in the opening 54A, the operator inserts the lower shaft portion 74 into the lower shaft hole 82. While inserting the lower shaft portion 74 into the lower shaft hole 82, the operator changes the posture of the parking rod 71 to a direction in which the longitudinal direction of the parking rod 71 coincides with the vertical direction. The lower shaft portion 74 is inserted through the lower shaft hole 82 into the metal bush 84, whereas the upper shaft portion 73 of the parking rod 71 is located under the upper shaft hole 78. When the upper shaft portion 73 is located under the upper shaft hole 78, the longitudinal direction of the parking rod 71 nearly extends in the vertical direction.

Figure 9D:
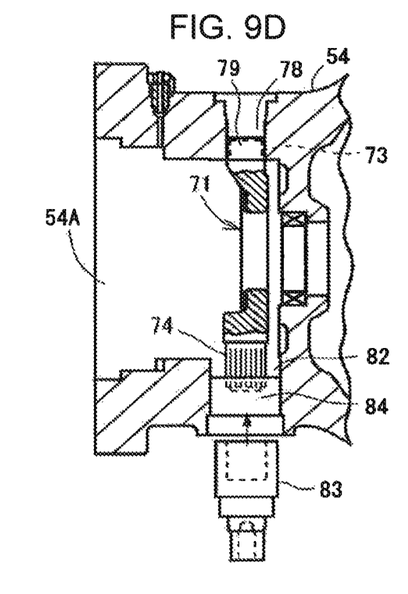

Secondly, the operator raises the parking rod 71 and inserts the upper shaft portion 73 of the parking rod 71 into the upper shaft hole 78. The upper shaft portion 73 is inserted through the upper shaft hole 78 into the metal bush 79 as shown in FIG. 9D. After the upper shaft portion 73 is inserted into the metal bush 79, the operator inserts the connecting shaft 83 into the lower shaft hole 82 from the other end thereof. The connecting shaft 83 is inserted through the lower shaft hole 82 to be fitted to the lower shaft portion 74 by a spline joint with the connecting shaft 83 inserted into the metal bush 84. The lower end portion of the connecting shaft 83 protrudes from the shaft case 52.

In this step, the assembling of the parking rod 71 in the first shaft case portion 54 has been completed. Although an illustration is omitted, the operator fixes the supporting plate 86 to the first shaft case portion 54 and connects the arm member 87 to the lower end portion of the connecting shaft 83. The plug 80 is mounted on the first shaft case portion 54. The wire, the coil spring, and the clevis (not shown) are mounted on the arm member 87. The hollow piston 65 is inserted into the opening 54A and mounted on the first shaft case portion 54. The second shaft case portion 55 having the push cylinder 58 is connected to the first shaft case portion 54, so that the assembling of the pressing mechanism 70 is completed. The rotary shaft 53 is inserted into the completed pressing mechanism 70. When the stators 57 is mounted in the second shaft case portion 55 and the brake discs 56 is fitted to the rotary shaft 53 by a spline joint, the assembling of the wet parking brake device 50 is completed.

The following will describe the operation of the wet parking brake device 50 according to the second embodiment. When an operator of the forklift operates the parking lever or the parking pedal to set the wet parking brake device 50 in a braking state, the arm member 87 is caused to turn in one direction around the central axis Q of the parking rod 71.

By the turning of the parking rod 71 in response to the turning of the arm member 87, the rod main body 72 presses the hollow piston 65. The rod main body 72 has the pressing portions 77 configured to press the pressed portions 69 of the hollow piston 65. Therefore, the parking rod 71 presses the hollow piston 65 in the axial direction of the rotary shaft 53. When the hollow piston 65 is pressed, the push cylinder 58 is moved in the axial direction of the rotary shaft 53 by the pressure of the hollow piston 65, and the stators 57 is pressed toward the wheel side. The pressure from the push cylinder 58 decreases the respective spaces between the stators 57 and the brake discs 56, and then the stators 57 and the brake discs 56 are in pressure contact with each other. These contacts generate the braking force against the rotary shaft 53, and thus, the wet parking brake device 50 is set in the braking state. In the braking state, the central axis of the insertion hole 75 of the parking rod 71 coincides with the central axis P of the rotary shaft 53.

When an operator of the forklift operates the parking lever or the parking pedal to release the braking state of the wet parking brake device 50, the arm member 87 is caused to turn in the direction opposite to the turning direction in the braking state around the central axis Q of the parking rod 71. At this time, the parking rod 71 turns in another direction in response to the turning of the arm member 87. The parking rod 71 is detached from the hollow piston 65, and then the push cylinder 58 returns to an original position by receiving the urging force of the coil spring 64. The hollow piston 65 also returns to the original position with the push cylinder 58. Returning the push cylinder 58 and the hollow piston 65 to the original position increases the respective spaces between the stators 57 and the brake discs 56 so as to release the braking state of the wet parking brake device 50. In a released state in which the braking force is released, the central axis of the insertion hole 75 of the parking rod 71 is inclined relative to the central axis P of the rotary shaft 53.

The wet parking device and the method of assembling the wet parking brake device according to the second embodiment offer the same advantageous effects as those of (1) to (3) of the first embodiment. Even if a piston member is configured of the hollow piston 65 and the push cylinder 58 instead of just a piston plate, the wet parking brake device and the assembling method maintain the required strength of a shaft case 52 without any limitation of the space for mounting the shaft case 52.

The present disclosure is not limited to the specific embodiments described above, and may appropriately be modified within the gist of the present invention. For example, the following modifications may be allowed.

The embodiments described above, in which the shaft hole through which the connecting shaft is inserted is located in the lower part of the shaft case, is not limited to this configuration. The shaft hole through which the connecting shaft is inserted may be formed in the upper part of the shaft case. In this case, the arm member connected to the connecting shaft is located in the upper side of the shaft case.

The embodiments described above, in which the parking rod has the insertion hole through which the rotary shaft is inserted, is not limited to this configuration, and a parking rod which has no such insertion hole is also applicable.

In the above embodiments, the present disclosure is applied to a forklift as an industrial vehicle. However, the present disclosure may also be applied to a load handling vehicles other than a forklift or a construction vehicle.

What is claimed is:
1. A wet parking brake device comprising:
a shaft case;
a rotary shaft accommodated in the shaft case;
a plurality of stators held on the shaft case and arranged side by side movably in an axial direction of the rotary shaft;
a plurality of brake discs held on the rotary shaft and each of which is interposed between any two adjacent stators of the plurality of stators;
a piston member held on the shaft case and movable toward the brake discs in the axial direction of the rotary shaft; and
a pressing mechanism configured to press the piston member toward the brake discs,
the wet parking brake device being configured such that the brake discs and the stators come in contact with each other by a pressure from the piston member pressed by the pressing mechanism to thereby generate a braking force against the rotary shaft, wherein the pressing mechanism includes a parking rod which is turnably supported in the shaft case, the parking rod includes:

a rod main body which has a pressing portion configured to press the piston member;

a turning shaft portion located on an upper part or a lower part of the rod main body; and     a connecting shaft fitted to the turning shaft portion by a spline joint and turnably inserted in the shaft case, the shaft case includes:

an opening extending in the axial direction of the rotary shaft; and     a shaft hole having a diameter which is larger than a diameter of the turning shaft portion such that the connecting shaft is inserted into the shaft hole, and a length of the parking rod, the diameter of the shaft hole, and the diameter of the turning shaft portion are respectively designed such that the turning shaft portion is inserted into the shaft hole when the parking rod is inserted from the opening.

2. The wet parking brake device according to claim 1, wherein the rod main body has an insertion hole through which the rotary shaft is inserted.

3. A method of assembling a wet parking brake device, the wet parking brake device including:

a shaft case;

a rotary shaft accommodated in the shaft case;

a plurality of stators held on the shaft case and arranged side by side movably in an axial direction of the rotary shaft;

a plurality of brake discs held on the rotary shaft and each of which is interposed between two adjacent stators;

a piston member held on the shaft case and movable toward the brake discs in the axial direction of the rotary shaft; and a pressing mechanism configured to press the piston member toward the brake discs, the method of assembling the wet parking brake device being configured such that the brake discs and the stators come in contact with each other by a pressure from the piston member pressed by the pressing mechanism to thereby generate a braking force against the rotary shaft, the pressing mechanism includes a parking rod which is turnably supported in the shaft case, the parking rod includes:

a rod main body which has a pressing portion configured to press the piston member;

a turning shaft portion located on an upper part or a lower part of the rod main body; and     a connecting shaft fitted to the turning shaft portion by a spline joint and turnably inserted in the shaft case, the shaft case includes:

an opening extending in the axial direction of the rotary shaft; and     a shaft hole having a diameter which is larger than a diameter of the turning shaft portion such that the connecting shaft is inserted into the shaft hole, wherein a length of the parking rod, the diameter of the shaft hole, and the diameter of the turning shaft portion are respectively designed such that the turning shaft portion is inserted into the shaft hole when the parking rod is inserted from the opening, and the method comprises:

inserting the parking rod from the opening;

inserting the turning shaft portion through the shaft hole; and fitting the connecting shaft to the turning shaft portion by a spline joint.

\* \* \* \* \*